United States Patent
Chen et al.

(10) Patent No.: US 10,264,611 B2
(45) Date of Patent: Apr. 16, 2019

(54) DEVICE AND METHOD OF HANDLING RADIO RESOURCE CONTROL CONNECTION RESUME PROCEDURE

(71) Applicant: HTC Corporation, Taoyuan (TW)

(72) Inventors: Te-Ming Chen, Taoyuan (TW); Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 256 days.

(21) Appl. No.: 15/469,573

(22) Filed: Mar. 26, 2017

(65) Prior Publication Data

US 2017/0290072 A1 Oct. 5, 2017

Related U.S. Application Data

(60) Provisional application No. 62/314,977, filed on Mar. 29, 2016.

(51) Int. Cl.
| | | |
|---|---|---|
| *H04W 76/10* | (2018.01) | |
| *H04W 76/25* | (2018.01) | |
| *H04W 72/04* | (2009.01) | |
| *H04W 76/19* | (2018.01) | |

(52) U.S. Cl.
CPC ........... *H04W 76/10* (2018.02); *H04W 72/04* (2013.01); *H04W 76/25* (2018.02); *H04W 76/19* (2018.02)

(58) Field of Classification Search
CPC ..... H04W 76/10; H04W 76/25; H04W 72/04; H04W 76/19
See application file for complete search history.

(56) References Cited

U.S. PATENT DOCUMENTS

| | | | | |
|---|---|---|---|---|
| 10,187,910 B2* | 1/2019 | Kim | ............... | H04W 72/048 |
| 2004/0224709 A1* | 11/2004 | Yi | ............... | H04W 76/18 |
| | | | | 455/515 |
| 2013/0273900 A1* | 10/2013 | Iwai | ............... | H04W 76/28 |
| | | | | 455/419 |
| 2016/0135231 A1* | 5/2016 | Lee | ............... | H04W 68/12 |
| | | | | 370/329 |

OTHER PUBLICATIONS

3GPP TS 24.301 V13.5.0, Mar. 2016.
3GPP TS 36.331 V13.1.0, Mar. 2016.
(Continued)

*Primary Examiner* — Joseph E Dean, Jr.
(74) *Attorney, Agent, or Firm* — Winston Hsu (57) ABSTRACT

A method of handling a RRC connection resume procedure between a first layer and a second layer of a communication device, the method comprises the first layer in a first idle mode with suspend indication transmit a first request message for resuming a RRC connection and at least one first identity parameter to the second layer, after receiving a suspend indication from the second layer; the second layer transmit the RRC connection resume request message to the network, after receiving the first request message from the first layer; the second layer receive a first RRC connection setup message from the network, after transmitting the RRC connection resume request message to the network; and the second layer transmit a first RRC connection setup complete message comprising the at least one first identify parameter to the network, after receiving the first RRC connection setup message from the network.

19 Claims, 7 Drawing Sheets

(56) References Cited

OTHER PUBLICATIONS

3GPP TSG-RAN WG 2 Meeting #93 R2-162038, Feb. 2016.
3GPP TSG-SA WG2 #113AH S2-161228, Feb. 2016.
Search Report dated Aug. 28, 2017 for EP application No. 17163150.0, pp. 1-5.
3GPP TR 23.720 V13.0.0 (Mar. 2016), "3rd Generation Partnership Project; Technical Specification Group Services and System Aspects; Study on architecture enhancements for Cellular Internet of Things (Release 13)", XP051087943, pp. 1-94.
3GPP TR 23.887 V12.0.0 (Dec. 2013), "3rd Generation Partnership Project; Technical Specification Group Services and System Aspects; Study on Machine-Type Communications (MTC) and other mobile data applications communications enhancements (Release 12)", XP050916398, pp. 1-151.
3GPP TS 24.301 V13.5.0 (Mar. 2016), "3rd Generation Partnership Project; Technical Specification Group Core Network and Terminals; Non-Access-Stratum (NAS) protocol for Evolved Packet System (EPS); Stage 3 (Release 13)", XP051088177, pp. 1-414.
Ericsson, "RRC Connection Suspend and Resume", 3GPP TSG-RAN WG2 NB-IOT Ad-hoc Meeting, Tdoc R2-160475, Jan. 19-21, 2016, Budapest, Hungary, XP051066479, pp. 1-14.

\* cited by examiner

DEVICE AND METHOD OF HANDLING RADIO RESOURCE CONTROL CONNECTION RESUME PROCEDURE

CROSS REFERENCE TO RELATED APPLICATIONS

This application claims the benefit of U.S. Provisional Application No. 62/314,977, filed on Mar. 29, 2016, which is incorporated herein by reference.

BACKGROUND OF THE INVENTION

1. Field of the Invention

The present invention relates to a communication device and a method used in a wireless communication system, and more particularly, to a communication device and method of handling a radio resource control (RRC) connection resume procedure.

2. Description of the Prior Art

When performing a RRC connection resume procedure, an EMM layer of a UE may only provide a RRC establishment cause and a call type to a RRC layer of the UE. Then, the RRC layer transmits a RRC connection resume request message to a network. The network may transmit a RRC connection setup message to the UE. However, the RRC layer cannot transmit a RRC connection setup complete message to the network for responding to the RRC connection setup message, because the RRC layer has not received information from the EMM layer. In this situation, it is unknown how to handle the RRC connection setup complete message. Accordingly, the RRC connection resume procedure cannot be performed successfully.

Thus, how to handle the RRC connection resume procedure is an important problem to be solved.

SUMMARY OF THE INVENTION

The present invention therefore provides a method and related communication device for handling a radio resource control (RRC) connection resume procedure to solve the abovementioned problem.

A method of handling a radio resource control (RRC) connection resume procedure between a first layer and a second layer of a communication device, the method comprises the first layer in a first idle mode with suspend indication transmit a first request message for resuming a RRC connection and at least one first identity parameter to the second layer, after receiving a suspend indication from the second layer; the second layer transmit a RRC connection resume request message to a network, after receiving the first request message from the first layer; the second layer receive a first RRC connection setup message from the network, after transmitting the RRC connection resume request message to the network; and the second layer transmit a first RRC connection setup complete message comprising the at least one first identify parameter to the network, after receiving the first RRC connection setup message from the network.

A method of handling a radio resource control (RRC) connection resume procedure between a first layer and a second layer of a communication device, the method comprises the first layer transmitting a first request message for establishing a RRC connection and at least one first identity parameter to the second layer; the second layer establish the RRC connection with a network, after receiving the first request message and the at least one first identity parameter from the first layer; the second layer receiving a RRC suspend request message from the network; the second layer suspending the RRC connection and transmitting a suspend indication to the first layer, after receiving the RRC suspend request message; the first layer entering a first idle mode with suspend indication, when receiving the suspend indication; the second layer not releasing the at least one first identity parameter received from the first layer, when the RRC connection is suspended; the second layer storing the at least one first identity parameter; the first layer in the first idle mode with suspend indication transmitting a second request message for resuming the RRC connection to the second layer, after receiving the suspend indication from the second layer; the second layer transmitting a RRC connection resume request message to the network, after receiving the second request message from the first layer; the second layer receiving a first RRC connection setup message from the network, after transmitting the RRC connection resume request message to the network; and the second layer transmitting a first RRC connection setup complete message comprising the at least one first identify parameter to the network, after receiving the first RRC connection setup message from the network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
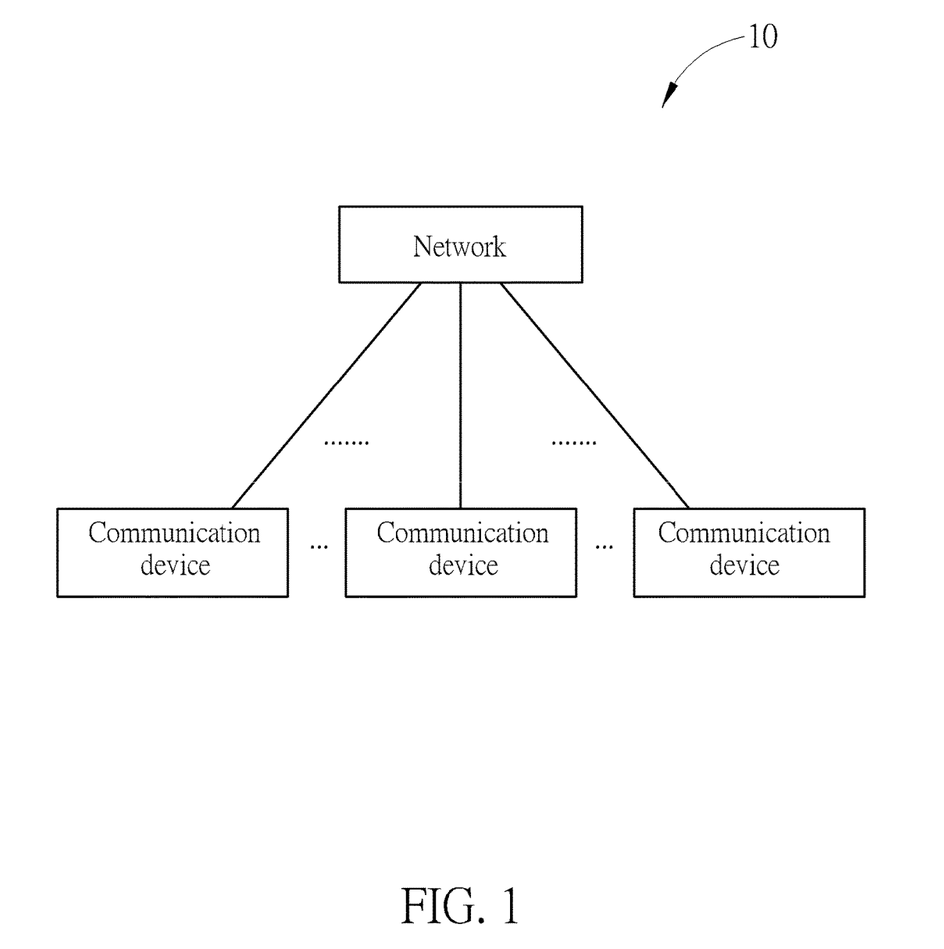
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be a universal terrestrial radio access network (UTRAN) including at least one Node-Bs (NB) in a universal mobile telecommunications system (UMTS). Alternatively, the network may be an evolved UTRAN (E-UTRAN) including at least one evolved NB (eNB) and/or at least one relay in a long term evolution (LTE) system, a LTE-Advanced (LTE-A) system, an evolution of the LTE-A system, or a fifth generation (5G) system. Further, the network may also include both the UTRAN/E-UTRAN and a core network, wherein the core network includes network entities such as a mobility management entity (MME), a serving gateway (S-GW), a packet data network (PDN) gateway (P-GW), a self-organizing networks (SON) server and/or a radio network controller (RNC), etc.

The communication device may be a user equipment (UE), a mobile phone, a laptop, a tablet computer, an electronic book, a portable computer system, a vehicle or an aircraft. In addition, the network and the communication device can be seen as a transmitter or a receiver according to transmission direction, e.g., for a uplink (UL), the communication device is the transmitter and the network is the receiver, and for a downlink (DL), the network is the transmitter and the communication device is the receiver.

Figure 2:
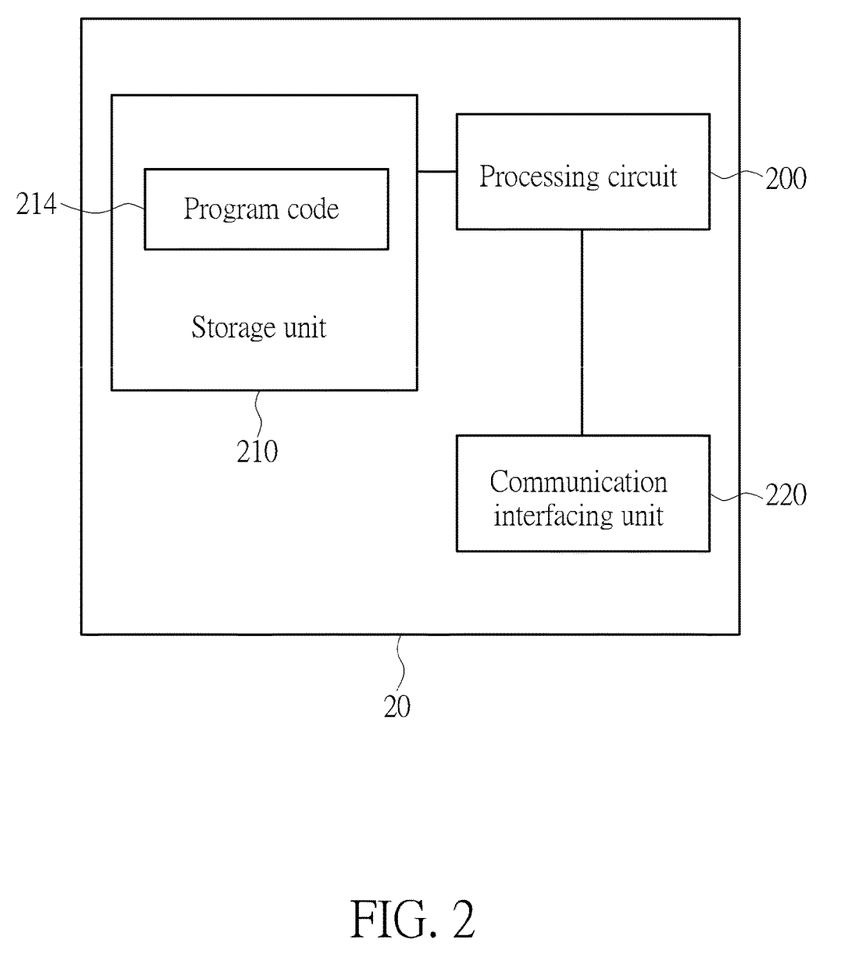
FIG. 2 is a schematic diagram of a communication device according to an example of the present invention.

FIG. 2 is a schematic diagram of a communication device 20 according to an example of the present invention. The communication device 20 may be the communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that stores a program code 214, accessed and executed by the processing circuit 200. Examples of the storage unit 210 include but are not limited to a read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver used to transmit and receive signals (e.g., data, signals, messages and/or packets) according to processing results of the processing circuit 200.

In the following diagrams and embodiments, a UE is used to represent the communication device in FIG. 1, to simplify the illustration of the embodiments.

Figure 3:
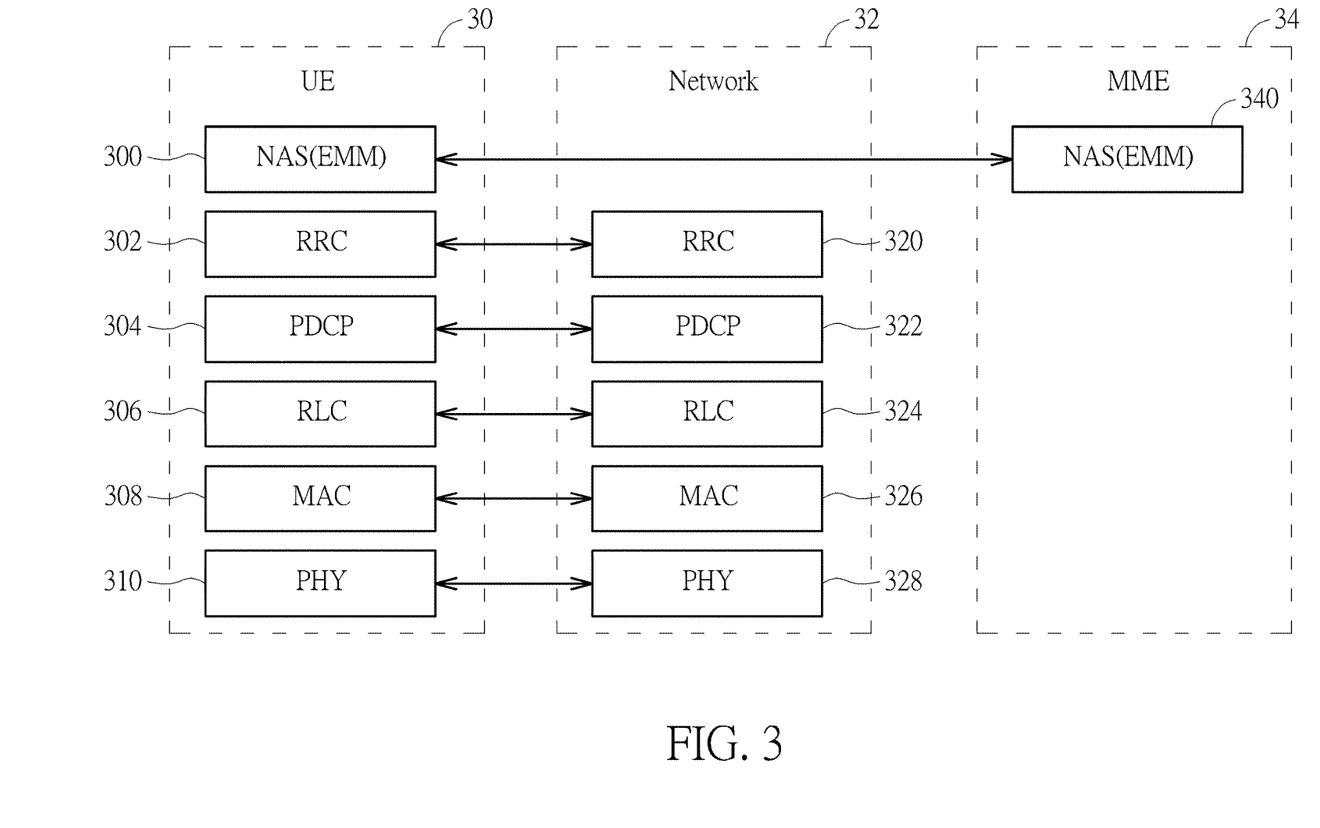
FIG. 3 is a schematic diagram of a protocol stack in a control plane according to an example of the present invention.

FIG. 3 is a schematic diagram of a protocol stack in a control plane according to an example of the present invention. There are at least 6 protocol layers, a non-access stratum (NAS) layer 300, a radio resource control (RRC) layer 302, a packet data convergence control (PDCP) layer 304, a radio link control (RLC) layer 306, a medium access (MAC) layer 308 and a physical (PHY) layer 310 in a UE 30 (e.g., the communication device in FIG. 1). In detail, an evolved packet system (EPS) mobility management (EMM) may be included in the NAS layer of the UE. Thus, an EMM layer of the UE may be used for representing the NAS layer of the UE. Further, there are at least 5 protocol layers which include a RRC layer 320, a PDCP layer 322, a RLC layer 324, a MAC layer 326 and a PHY layer 328 in a network 32 (e.g., the network in FIG. 1). There is at least one protocol layer which includes a NAS layer 340 in a MME 34. In addition, there are 2 modes (e.g., states) which include an EMM_IDLE mode and an EMM_CONNECTED mode corresponding to the EMM layer of the UE. There are 2 modes which include an EMM_IDLE mode with suspend indication and an EMM_IDLE mode without suspend indication corresponding to the EMM_IDLE mode. There are 2 modes which include a RRC_IDLE mode and a RRC_CONNECTED mode corresponding to the RRC layer of the UE. In general, the EMM layer of the UE 300 may request the RRC layer of the UE 302 to establish or resume a RRC connection, when the EMM layer of the UE 300 needs to transmit a NAS protocol data unit (PDU) to the NAS layer of the MME 340 and the UE 30 is in an idle mode. The RRC layer of the UE 302 may enter the RRC_CONNECTED mode, when there is a RRC connection between the UE 30 and the network 32. The EMM layer of the UE 300 may enter the EMM_CONNECTED mode, when there is a NAS signaling connection between the UE 30 and the MME 34.

Figure 4:
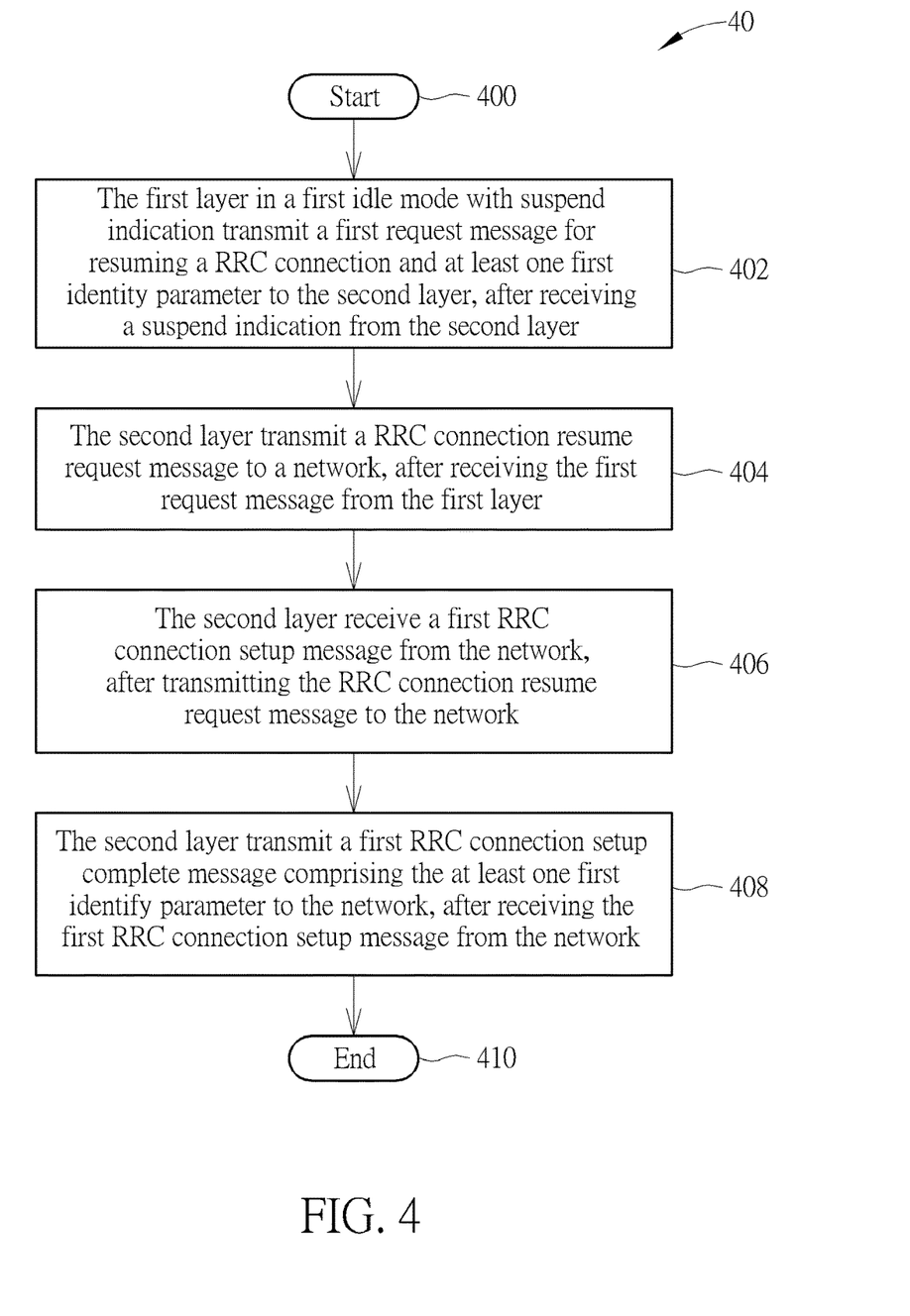
FIG. 4 is a flowchart of a process according to an example of the present invention.

FIG. 4 is a flowchart of a process 40 according to an example of the present invention. The process 40 may be utilized in a first layer (e.g., the EMM layer of the UE or the NAS layer of the UE in FIG. 3) and a second layer (e.g., the RRC layer of the UE in FIG. 3) of a UE (e.g., the communication device in FIG. 1). The process 40 includes the following steps:

Step 400: Start.

Step 402: The first layer in a first idle mode with suspend indication transmit a first request message for resuming a RRC connection and at least one first identity parameter to the second layer, after receiving a suspend indication from the second layer.

Step 404: The second layer transmit a RRC connection resume request message to a network, after receiving the first request message from the first layer.

Step 406: The second layer receive a first RRC connection setup message from the network, after transmitting the RRC connection resume request message to the network.

Step 408: The second layer transmit a first RRC connection setup complete message comprising the at least one first identify parameter to the network, after receiving the first RRC connection setup message from the network.

Step 410: End.

According to the process 40, the first layer in a first idle mode (e.g., state) with suspend indication (e.g., EMM_IDLE mode with suspend indication) may transmit a first request message for resuming a RRC connection and at least one first identity parameter (e.g., at least one of a system architecture evolution (SAE)-Temporary Mobile Subscriber Identity (S-TMSI), a MME group identity (ID) a MME code) to the second layer, after receiving a suspend indication from the second layer. Then, the second layer may transmit a RRC connection resume request message to a network (e.g., the network in FIG. 1), after receiving the first request message from the first layer. The second layer may receive a first RRC connection setup message (e.g., RRC-ConnectionSetup message) from the network, after transmitting the RRC connection resume request message to the network. The second layer may transmit a first RRC connection setup complete message (e.g., RRCConnectionSetupComplete message) including the at least one first identify parameter to the network, after receiving the first RRC connection setup message from the network. That is, the second layer can transmit the first RRC connection setup complete message including the at least one first identify parameter to the network in response to the first RRC connection setup message, because the second layer has received the at least one first identify parameter from the first layer. Accordingly, the second layer is able to handle the RRC connection setup complete message, when the RRC connection resume procedure is performed with the reception of the first RRC connection setup message from the network. Thus, the problem of handling the RRC connection resume procedure can be solved.

In one example, the first layer in the first idle mode with suspend indication may transmit the first request message for resuming the RRC connection to the second layer when the first layer initiates a service request procedure or an extended service request procedure.

In one example, the second layer may inform to the first layer whether the RRC connection is resumed unsuccessfully and/or established successfully (e.g., fallback) according to the first RRC connection setup message received from the network. It should be noted that the second layer may be able to know that the RRC connection is resumed unsuccessfully and/or established successfully, after receiving the first RRC connection setup message transmitted by the network in response to the RRC connection resume request message transmitted by the second layer.

In one example, the first layer may enter a first connected mode (e.g., EMM_CONNECTED mode). That is, the first layer may be informed that the RRC connection is resumed unsuccessfully and established successfully simultaneously. In one example, the first layer may enter the first idle mode without suspend indication (e.g., EMM_IDLE mode without suspend indication), and may enter the first connected mode after entering the first idle mode without suspend indication. That is, the first layer may first be informed that the RRC connection is resumed unsuccessfully, and may then be informed that the RRC connection is established successfully.

In one example, the at least one first identity parameter may include at least one of a first S-TMSI (e.g., including a public land mobile network (PLMN) ID), a first MME group ID and a first MME code.

In one example, the following steps may be performed before the first layer receives the suspend indication from the second layer (e.g., before Step 402): the first layer may transmit a second request message for establishing the RRC connection and at least one second identity parameter (e.g., at least one of a S-TMSI, a MME group ID a MME code) to the second layer. Then, the second layer may transmit a RRC connection request message (e.g., RRCConnectionRequest message) to the network, after receiving the second request message from the first layer. The second layer may receive a second RRC connection setup message (e.g., RRCConnectionSetup message) from the network and may enter a second connected mode (e.g., RRC_CONNECTED mode), after transmitting the RRC connection request message to the network. The second layer may transmit a second RRC connection setup complete message (e.g., RRCConnectionSetupComplete message) including the at least one second identity parameter to the network, after receiving the second RRC connection setup message from the network. The second layer may perform data transmission/reception with the network, after transmitting the second RRC connection setup complete message. Further, the second layer may receive a RRC suspend request message (e.g., RRCConnectionRelease message) from the network. Then, the second layer may suspend the RRC connection and may transmit the suspend indication to the first layer, after receiving the RRC suspend request message. The first layer may enter the first idle mode with suspend indication (e.g., EMM_IDLE mode with suspend indication), after receiving the suspend indication.

In one example, the at least one second identity parameter may include at least one of a second S-TMSI (e.g., including the PLMN ID), a second MME group identity and a second MME code. In one example, the at least one second identity parameter and the at least one first identity parameter may be the same or different. In one example, the first request message may include at least one of a RRC establishment cause and a call type.

Figure 5:
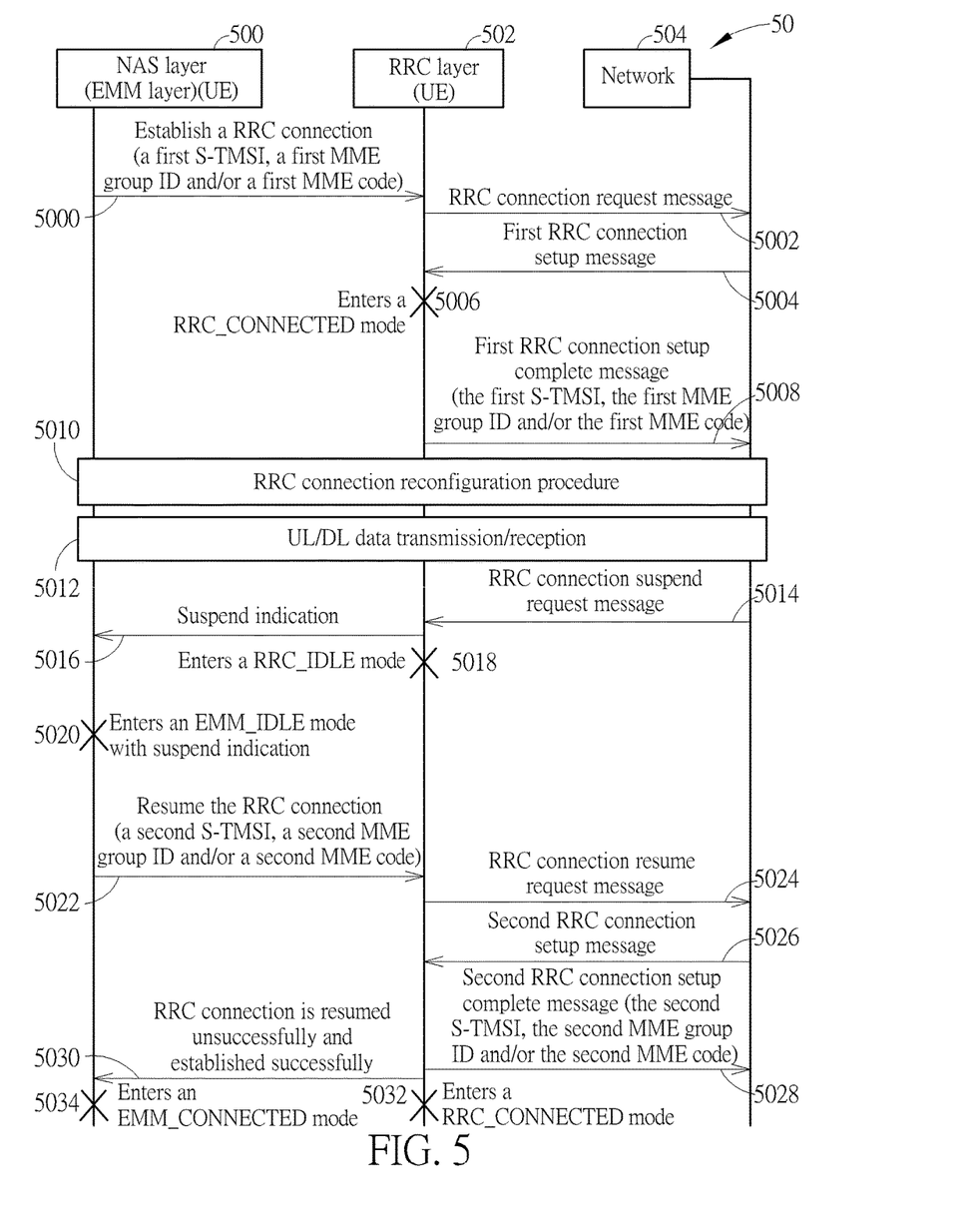
FIG. 5 is a flow diagram of a RRC connection resume procedure according to an example of the present invention.

FIG. 5 is a flow diagram of a RRC connection resume procedure 50 according to an example of the present invention. At an event 5000, an NAS (EMM) layer of a UE 500 requests an RRC layer of the UE 502 to establish a RRC connection, and transmits at least one of a first S-TMSI, a first MME group ID and a first MME code to the RRC layer of the UE 502. At an event 5002, the RRC layer of the UE 502 transmits a RRC connection request message to a network 504. At an event 5004, the RRC layer of the UE 502 receives a first RRC connection setup message from the network 504, and enters a RRC_CONNECTED mode. At an event 5006, the RRC layer of the UE 502 enters a RRC_CONNECTED mode. At an event 5008, the RRC layer of the UE 502 transmits a first RRC connection setup complete message including the at least one of the first S-TMSI, the first MME group ID and the first MME code to the network 504. At an event 5010, a RRC connection reconfiguration procedure is performed. At an event 5012, the RRC layer of the UE 502 performs UL/DL data transmission/reception with the network 504. At an event 5014, the RRC layer of the UE 502 receives a RRC connection suspend request message from the network 504, and enters a RRC_IDLE mode. At an event 5016, the RRC layer of the UE 502 suspends the RRC connection, and transmits a suspend indication to the EMM layer of the UE 500. At an event 5018, the RRC layer of the UE 502 enters a RRC_IDLE mode. At an event 5020, the EMM layer of the UE 500 enters an EMM_IDLE mode with suspend indication. At an event 5022, the EMM layer of the UE 500 in the first idle mode with suspend indication request the RRC layer of the UE 502 to resume the RRC connection, and transmits at least one of a second S-TMSI, a second MME group ID and a second MME code to the RRC layer of the UE 502. At an event 5024, the RRC layer of the UE 502 transmits a RRC connection resume request message to the network 504. At an event 5026, the RRC layer of the UE 502 receives a second RRC connection setup message from the network 504. At an event 5028, the RRC layer of the UE 52 transmits a second RRC connection setup complete message including the at least one of the second S-TMSI, the second MME group ID and the second MME code to the network 54. At an event 5030, the RRC layer of the UE 52 informs the EMM layer of the UE 50 that the RRC connection is resumed unsuccessfully and established successfully. At an event 5032, the RRC layer of the UE 502 enters a RRC_CONNECTED mode. At an event 5034, the EMM layer of the UE 500 enters an EMM_CONNECTED mode.

Figure 6:
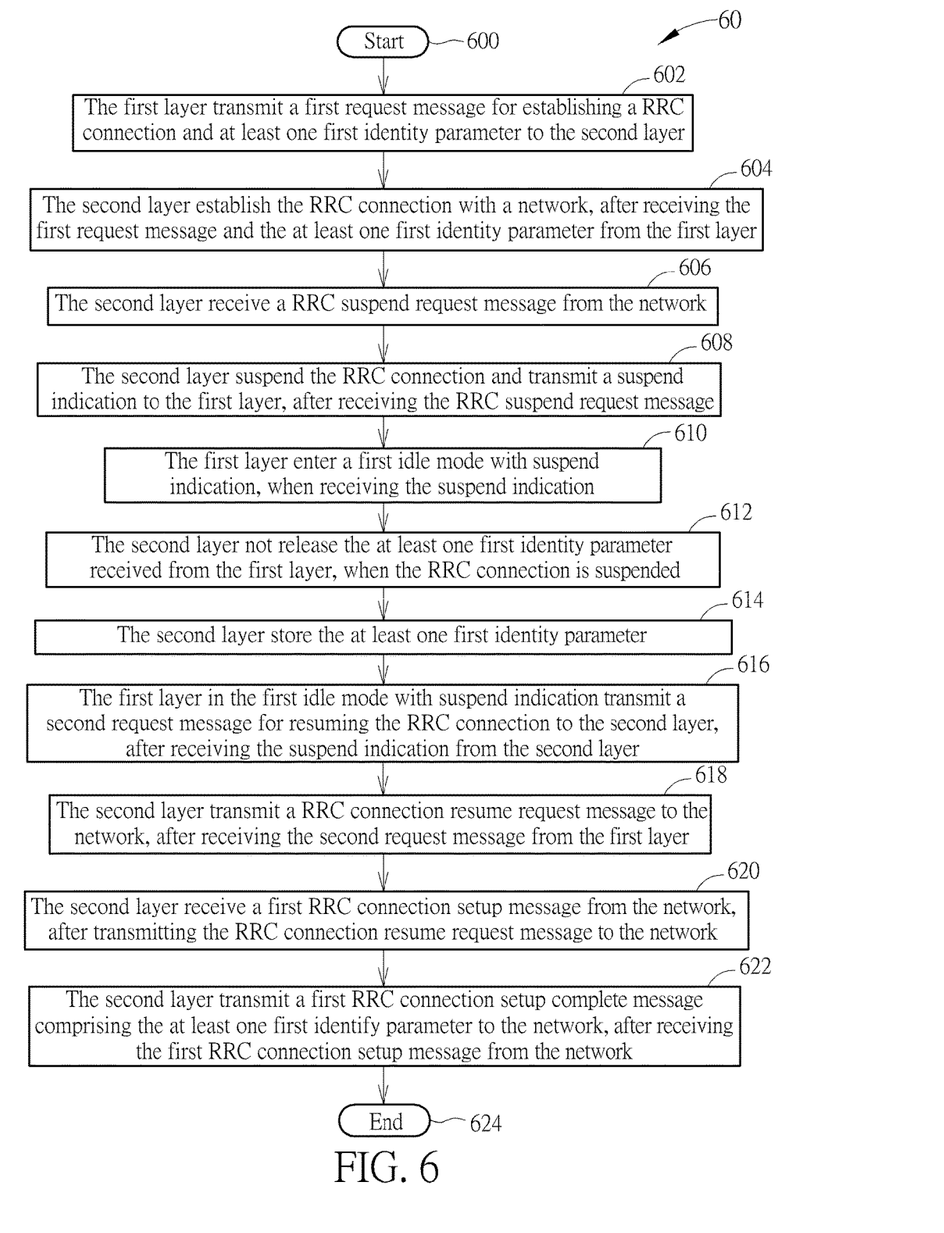
FIG. 6 is a flowchart of a process according to an example of the present invention.

FIG. 6 is a flowchart of a process 60 according to an example of the present invention. The process 60 may be utilized in a first layer (e.g., the EMM layer of the UE or the NAS layer of the UE in FIG. 3) and a second layer (e.g., the RRC layer of the UE in FIG. 3) of a UE (e.g., the communication device in FIG. 1). The process 60 includes the following steps:

Step 600: Start.

Step 602: The first layer transmit a first request message for establishing a RRC connection and at least one first identity parameter to the second layer.

Step 604: The second layer establish the RRC connection with a network, after receiving the first request message and the at least one first identity parameter from the first layer.

Step 606: The second layer receive a RRC suspend request message from the network.

Step 608: The second layer suspend the RRC connection and transmit a suspend indication to the first layer, after receiving the RRC suspend request message.

Step 610: The first layer enter a first idle mode with suspend indication, when receiving the suspend indication.

Step 612: The second layer not release the at least one first identity parameter received from the first layer, when the RRC connection is suspended.

Step 614: The second layer store the at least one first identity parameter.

Step 616: The first layer in the first idle mode with suspend indication transmit a second request message for resuming the RRC connection to the second layer, after receiving the suspend indication from the second layer.

Step 618: The second layer transmit a RRC connection resume request message to the network, after receiving the second request message from the first layer.

Step 620: The second layer receive a first RRC connection setup message from the network, after transmitting the RRC connection resume request message to the network.

Step 622: The second layer transmit a first RRC connection setup complete message comprising the at least one first identify parameter to the network, after receiving the first RRC connection setup message from the network.

Step 624: End.

According to the process 60, the first layer may transmit a first request message for establishing a RRC connection and at least one first identity parameter to the second layer. The second layer may establish the RRC connection (e.g., perform a RRC establishment procedure) with a network (e.g., the network in FIG. 1), after receiving the first request message and the at least one first identity parameter from the first layer. Then, the second layer may receive a RRC suspend request message (e.g., RRCConnectionRelease message) from the network. The second layer may suspend the RRC connection and may transmit a suspend indication to the first layer, after receiving the RRC suspend request message. The first layer may enter a first idle mode (e.g., state) with suspend indication (e.g., EMM_IDLE mode with suspend indication), when receiving the suspend indication. The second layer may not release the at least one first identity parameter (e.g., at least one of S-TMSI, MME group ID MME code) received from the first layer, when the RRC connection is suspended. The second layer may store the at least one first identity parameter. Further, the first layer in the first idle mode with suspend indication may transmit a second request message for resuming the RRC connection to the second layer, after receiving the suspend indication from the second layer. Then, the second layer may transmit a RRC connection resume request message to the network, after receiving the second request message from the first layer. The second layer may receive a first RRC connection setup message (e.g., RRCConnectionSetup message) from the network, after transmitting the RRC connection resume request message to the network. The second layer may transmit a first RRC connection setup complete message (e.g., RRCConnectionSetupComplete message) including the at least one first identify parameter to the network, after receiving the first RRC connection setup message from the network. That is, the second layer can transmit the first RRC connection setup complete message including the at least one first identify parameter to the network in response to the first RRC connection setup message, because the second layer does not release the at least one first identify parameter which has been received from the first layer. Accordingly, the second layer is able to handle the RRC connection setup complete message, when the RRC connection resume procedure is performed with the reception of the first RRC connection setup message from the network. Thus, the problem of handling the RRC connection resume procedure can be solved.

In one example, the first layer in the first idle mode with suspend indication may transmit the second request message for resuming the RRC connection to the second layer when the first layer initiates a service request procedure or an extended service request procedure.

In one example, the second layer may inform to the first layer whether the RRC connection is resumed unsuccessfully and/or established successfully (e.g., fallback) according to the first RRC connection setup message received from the network. It should be noted that the second layer may be able to know that the RRC connection is resumed unsuccessfully and/or established successfully, after receiving the first RRC connection setup message transmitted by the network in response to the RRC connection resume request message transmitted by the second layer.

In one example, the first layer may enter a first connected mode (e.g., EMM_CONNECTED mode). That is, the first layer may be informed that the RRC connection is resumed unsuccessfully and established successfully simultaneously. In another example, the first layer may enter the first idle mode without suspend indication (e.g., EMM_IDLE mode without suspend indication), and may enter the first connected mode after entering the first idle mode without suspend indication. That is, the first layer may first be informed that the RRC connection is resumed unsuccessfully, and may then be informed that the RRC connection is established successfully.

In one example, the at least one first identity parameter may include at least one of a first S-TMSI (e.g., including a PLMN ID), a first MME group ID and a first MME code.

In one example, the step of the second layer establishing the RRC connection with the network (e.g., Step 604) may include the following steps: The second layer may transmit a RRC connection request message (e.g., RRCConnectionRequest message) to the network, after receiving the first request message from the first layer. Then, the second layer may receive a second RRC connection setup message (e.g., RRCConnectionSetup message) from the network and may enter a second connected mode (e.g., RRC_CONNECTED mode), after transmitting the RRC connection request message to the network. The second layer may transmit a second RRC connection setup complete message (e.g., RRCConnectionSetupComplete message) including the at least one first identity parameter to the network, after receiving the second RRC connection setup message from the network. The second layer may perform data transmission/reception with the network, after transmitting the second RRC connection setup complete message.

In one example, the second layer may receive at least one second identity parameter (e.g., at least one of a S-TMSI, a MME group ID a MME code), after storing the at least one first identity parameter. In one example, the second layer may overwrite the at least one first identity parameter by using the at least one second identity parameter.

In one example, the second layer may release the at least one first identity parameter, after entering a second idle mode (e.g., RRC_IDLE mode) and not any RRC connection being suspended.

Figure 7:
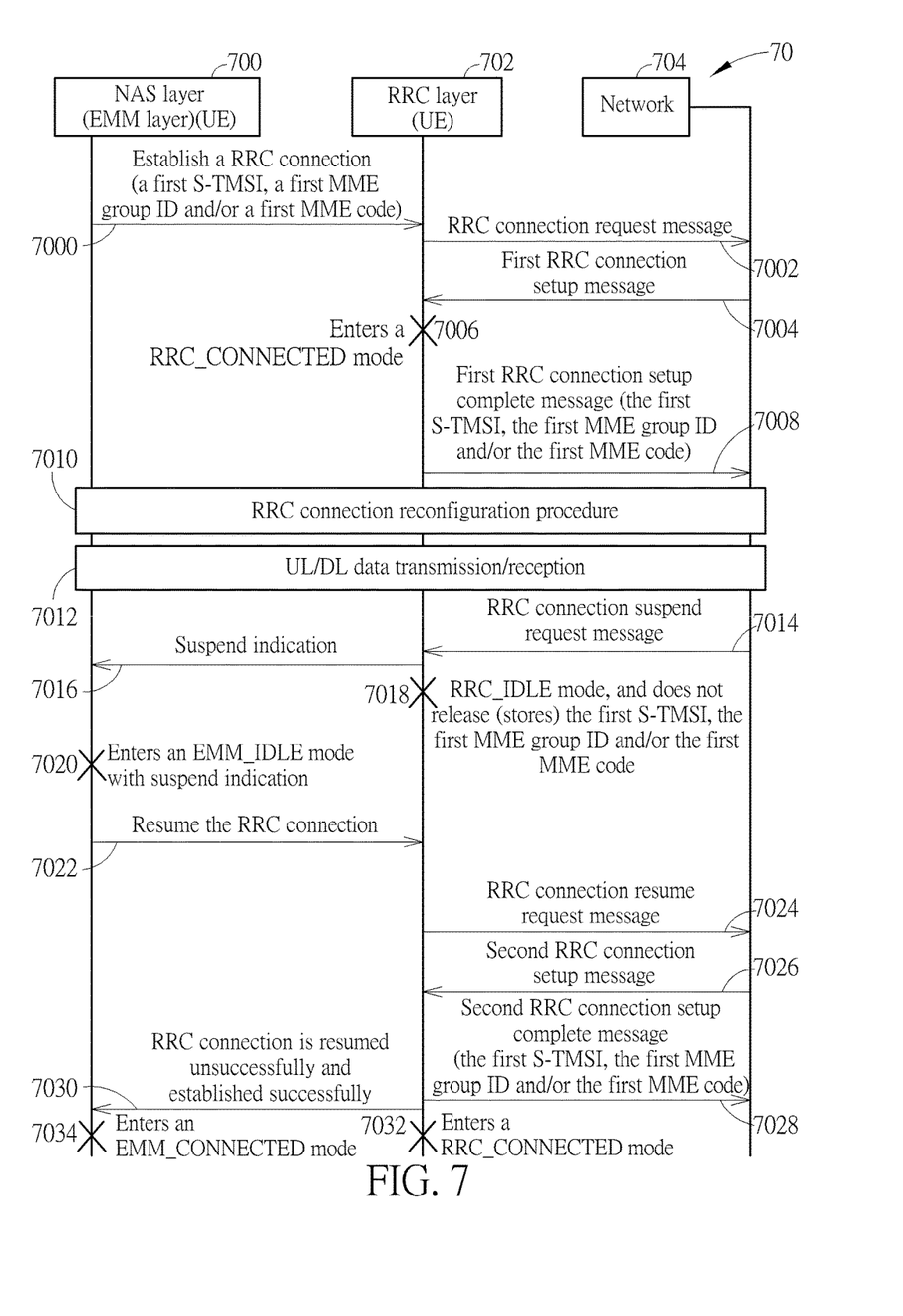
FIG. 7 is a flow diagram of a RRC connection resume procedure according to an example of the present invention.

FIG. 7 is a flow diagram of a RRC connection resume procedure 700 according to an example of the present invention. At an event 7000, an EMM layer of a UE 700 requests an RRC layer of the UE 702 to establish a RRC connection, and transmits at least one of a first S-TMSI, a first MME group ID and a first MME code to the RRC layer of the UE 72. At an event 7002, the RRC layer of the UE 702 transmits a RRC connection request message to a network 704. At an event 7004, the RRC layer of the UE 702 receives a first RRC connection setup message from the network 704. At an event 7006, the RRC layer of the UE 702 enters a RRC_CONNECTED mode. At an event 7008, the RRC layer of the UE 702 transmits a first RRC connection setup complete message including the at least one of the first S-TMSI, the first MME group ID and the first MME code to the network 704. At an event 7010, a RRC connection reconfiguration procedure is performed. At an event 7012, the RRC layer of the UE 702 performs data transmission/reception with the network 704. At an event 7014, the RRC layer of the UE 702 receives a RRC connection suspend request message from the network 704. At an event 7016, the RRC layer of the UE 702 suspends the RRC connection, and transmits a suspend indication to the EMM layer of the UE 700. At an event 7018, the RRC layer of the UE 702 enters a RRC_IDLE mode, and does not release (stores) the at least one of the first S-TMSI, the first MME group ID and the first MME code. At an event 7020, the EMM layer of the UE 700 enters an EMM_IDLE mode with suspend indication. At an event 7022, the EMM layer of the UE 700 in the first idle mode with suspend indication requests the RRC layer of the UE 702 to resume the RRC connection. At an event 7024, the RRC layer of the UE 704 transmits a RRC connection resume request message to the network 704. At an event 7026 the RRC layer of the UE 704 receives a second RRC connection setup message from the network 704. At an event 7028, the RRC layer of the UE 704 transmits a second RRC connection setup complete message including the at least one of the first S-TMSI, the first MME group ID and the first MME code to the network 704, and enters the RRC_CONNECTED mode. At an event 7030, the RRC layer of the UE 702 informs the EMM layer of the UE the 700 that the RRC connection is resumed unsuccessfully and established successfully. At an event 7032, the RRC layer of the UE 702 enters a RRC_CONNECTED mode. At an event 7034, the EMM layer of the UE 700 enters an EMM_CONNECTED mode.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. Any of the abovementioned processes may be compiled into the program code 214. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means be the communication device 20.

To sum up, the present invention provides a method and related communication device for handling a RRC connection resume procedure. Accordingly, the UE is able to handle the RRC connection setup complete message, when the RRC connection resume procedure is performed with a reception of the RRC connection setup message from the network. Thus, the problem of handling the RRC connection resume procedure is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a radio resource control (RRC) connection resume procedure between a first layer and a second layer of a communication device, the method comprising:

the first layer in a first idle mode with suspend indication transmitting a first request message for resuming a RRC connection and at least one first identity parameter to the second layer, after receiving a suspend indication from the second layer;

the second layer transmitting a RRC connection resume request message to a network, after receiving the first request message from the first layer;

the second layer receiving a first RRC connection setup message from the network, after transmitting the RRC connection resume request message to the network; and the second layer transmitting a first RRC connection setup complete message comprising the at least one first identify parameter to the network, after receiving the first RRC connection setup message from the network.

2. The method of claim 1, wherein the first layer in the first idle mode with suspend indication transmits the first request message for resuming the RRC connection to the second layer when the first layer initiates a service request procedure or an extended service request procedure.

3. The method of claim 1, further comprising:

the second layer informing to the first layer whether the RRC connection is resumed unsuccessfully and/or established successfully according to the first RRC connection setup message received from the network.

4. The method of claim 3, further comprising:

the first layer entering a first connected mode; or the first layer entering the first idle mode without suspend indication, and entering the first connected mode after entering the first idle mode without suspend indication.

5. The method of claim 1, wherein the at least one first identity parameter comprises at least one of a first system architecture evolution (SAE)-Temporary Mobile Subscriber Identity (S-TMSI), a first mobility management entity (MME) group identity and a first MME code.

6. The method of claim 1, wherein the steps performed before the first layer receiving the suspend indication from the second layer comprises:

the first layer transmitting a second request message for establishing the RRC connection and at least one second identity parameter to the second layer;

the second layer transmitting a RRC connection request message to the network, after receiving the second request message from the first layer;

the second layer receiving a second RRC connection setup message from the network and entering a second connected mode, after transmitting the RRC connection request message to the network;

the second layer transmitting a second RRC connection setup complete message comprising the at least one second identity parameter to the network, after receiving the second RRC connection setup message from the network;

the second layer performing data transmission/reception with the network, after transmitting the second RRC connection setup complete message;

the second layer receiving a RRC suspend request message from the network;

the second layer suspending the RRC connection and transmitting the suspend indication to the first layer, after receiving the RRC suspend request message; and the first layer entering the first idle mode with suspend indication, after receiving the suspend indication.

7. The method of claim 6, wherein the at least one second identity parameter comprises at least one of a second S-TMSI, a second MME group identity and a second MME code.

8. The method of claim 6, wherein the at least one second identity parameter and the at least one first identity parameter are the same or different.

9. The method of claim 1, wherein the first request message comprises at least one of a RRC establishment cause and a call type.

10. The method of claim 1, wherein the first layer is a non-access stratum (NAS) layer or an evolved packet system (EPS) mobility management (EMM) layer, and the second layer is a RRC layer.

11. A method of handling a radio resource control (RRC) connection resume procedure between a first layer and a second layer of a communication device, the method comprising:
the first layer transmitting a first request message for establishing a RRC connection and at least one first identity parameter to the second layer;
the second layer establishing the RRC connection with a network, after receiving the first request message and the at least one first identity parameter from the first layer;
the second layer receiving a RRC suspend request message from the network;
the second layer suspending the RRC connection and transmitting a suspend indication to the first layer, after receiving the RRC suspend request message;
the first layer entering a first idle mode with suspend indication, when receiving the suspend indication;
the second layer not releasing the at least one first identity parameter received from the first layer, when the RRC connection is suspended;
the second layer storing the at least one first identity parameter;
the first layer in the first idle mode with suspend indication transmitting a second request message for resuming the RRC connection to the second layer, after receiving the suspend indication from the second layer;
the second layer transmitting a RRC connection resume request message to the network, after receiving the second request message from the first layer;
the second layer receiving a first RRC connection setup message from the network, after transmitting the RRC connection resume request message to the network; and
the second layer transmitting a first RRC connection setup complete message comprising the at least one first identify parameter to the network, after receiving the first RRC connection setup message from the network.

12. The method of claim 11, wherein the first layer in the first idle mode with suspend indication transmits the second request message for resuming the RRC connection to the second layer when the first layer initiates a service request procedure or an extended service request procedure.

13. The method of claim 11, further comprising:
the second layer informing to the first layer whether the RRC connection is resumed unsuccessfully and/or established successfully according to the first RRC connection setup message received from the network.

14. The method of claim 13, further comprising:
the first layer entering a first connected mode; or
the first layer entering the first idle mode without suspend indication, and entering the first connected mode after entering the first idle mode without suspend indication.

15. The method of claim 11, wherein the at least one first identity parameter comprises at least one of a first system architecture evolution (SAE)-Temporary Mobile Subscriber Identity (S-TMSI), a first mobility management entity (MME) group identity and a first MME code.

16. The method of claim 11, wherein the step of the second layer establishing the RRC connection with the network comprising:
the second layer transmitting a RRC connection request message to the network, after receiving the first request message from the first layer;
the second layer receiving a second RRC connection setup message from the network and entering a second connected mode, after transmitting the RRC connection request message to the network;
the second layer transmitting a second RRC connection setup complete message comprising the at least one first identity parameter to the network, after receiving the second RRC connection setup message from the network;
the second layer performing data transmission/reception with the network, after transmitting the second RRC connection setup complete message.

17. The method of claim 11, further comprising:
the second layer receiving at least one second identity parameter, after storing the at least one first identity parameter; and
the second layer overwriting the at least one first identity parameter by using the at least one second identity parameter.

18. The method of claim 11, further comprising:
the second layer releasing the at least one first identity parameter, after entering a second idle mode and not any RRC connection being suspended.

19. The method of claim 11, wherein the first layer is a non-access stratum (NAS) layer or an evolved packet system (EPS) mobility management (EMM) layer, and the second layer is a RRC layer.

* * * * *